United States Patent
Ballester et al.

(10) Patent No.: US 8,126,089 B2
(45) Date of Patent: Feb. 28, 2012

(54) METHOD AND APPARATUS FOR PROVIDING FRAME SYNCHRONIZATION IN A DIGITAL COMMUNICATION SYSTEM THAT SUPPORTS MULTIPLE MODULATION FORMATS

(75) Inventors: Raul Benet Ballester, Premia de Mar (ES); Adriaan J. De Lind Van Wijngaarden, New Providence, NJ (US); Ralf Dohmen, VS-Villingen (DE); Bernd Dotterweich, Pommersfeldon (DE); Miguel Robledo, Nuremberg (DE); Swen Wunderlich, Dresden (DE)

(73) Assignee: Alcatel Lucent, Paris (FR)

( * ) Notice: Subject to any disclaimer, the term of this patent is extended or adjusted under 35 U.S.C. 154(b) by 1668 days.

(21) Appl. No.: 10/955,321

(22) Filed: Sep. 30, 2004

(65) Prior Publication Data

US 2006/0067368 A1    Mar. 30, 2006

(51) Int. Cl.
*H03D 3/18* (2006.01)
*H04L 27/22* (2006.01)

(52) U.S. Cl. ......... 375/330; 375/332; 375/335; 375/336

(58) Field of Classification Search .................. 375/330, 375/329, 331, 349, 361, 354, 291; 370/537, 370/366, 535, 508
See application file for complete search history.

(56) References Cited

U.S. PATENT DOCUMENTS

| | | | |
|---|---|---|---|
| 3,675,129 A * | 7/1972 | Melvin .......................... | 375/330 |
| 4,247,936 A | 1/1981 | Hustig | |
| 4,335,446 A * | 6/1982 | Gandini et al. ............... | 375/324 |
| 4,494,239 A * | 1/1985 | Martin .......................... | 375/261 |
| 4,651,319 A * | 3/1987 | Bowlds ......................... | 370/535 |
| 4,768,188 A | 8/1988 | Barnhart et al. | |
| 5,144,625 A * | 9/1992 | Cain et al. ..................... | 370/522 |
| 5,151,925 A | 9/1992 | Gelin et al. | |
| 5,185,736 A | 2/1993 | Tyrrell et al. | |
| 5,220,448 A | 6/1993 | Vogel et al. | |
| 5,265,105 A | 11/1993 | Iwane | |
| 5,276,709 A | 1/1994 | Kazawa et al. | |
| 5,285,458 A | 2/1994 | Yoshida | |
| 5,287,197 A * | 2/1994 | Sato ............................... | 386/49 |
| 5,828,676 A * | 10/1998 | Hurlbut et al. ................ | 714/752 |
| 6,148,045 A | 11/2000 | Taura et al. | |
| 6,172,993 B1 * | 1/2001 | Kim et al. ..................... | 370/516 |
| 6,275,537 B1 * | 8/2001 | Lee ............................ | 375/240.28 |
| 6,625,239 B1 * | 9/2003 | Shiraishi et al. .............. | 375/354 |
| 6,728,883 B1 * | 4/2004 | Kohashi et al. ................ | 726/26 |
| 7,039,132 B1 | 5/2006 | Chen et al. | |
| 2003/0081655 A1 * | 5/2003 | Nakamura et al. ............ | 375/141 |
| 2003/0156603 A1 * | 8/2003 | Rakib et al. ................... | 370/485 |
| 2004/0136411 A1 * | 7/2004 | Hornbuckle et al. .......... | 370/537 |

(Continued)

OTHER PUBLICATIONS

Muller-Weinfurtner, "Frequency-Domain Frame Synchronization for Optimum Frequency-Differential Demodulation of OFDM," Global Telecommunications Conference, 1999, GLOBECOM '99 vol. 1B, 1999 pp. 857-862, vol. 1b.

(Continued)

*Primary Examiner* — Khanh C Tran
*Assistant Examiner* — Qutbuddin Ghulamali
(74) *Attorney, Agent, or Firm* — Wall & Tong, LLP

(57) ABSTRACT

A method and apparatus for frame synchronization in digital communication systems using multiple modulation formats, including the Differential Phase Shift Keying (DPSK), Duobinary Signaling (DBS), and ON/OFF Keying (OOK) modulation formats, perform a search for both a frame alignment sequence (FAS) and the inverted FAS and determine the polarity of the received digital stream.

34 Claims, 5 Drawing Sheets

U.S. PATENT DOCUMENTS

2005/0008089 A1    1/2005  Bothe et al.
2006/0020433 A1*   1/2006  Taha et al. .................... 703/2
2006/0050819 A1*   3/2006  Van Houdt et al. ........... 375/354

OTHER PUBLICATIONS

Habuchi, "A Synchronization System with Differential Detector for the SS-CSC System," The $8^{th}$ IEEE Int. Symp. on Personal, Indoor and Mobile Radio Communications, 1997, Waves of the Year 2000, PIMRC'97, vol. 3, Sep. 1-4, 1997, pp. 835-839.

P. Robertson, "Optimum Frame Synchronization of Preamble-less Packets Surrounded by Noise with Coherent and Differentially Coherent Demodulation," IEEE Int. Conf. on Communications, 1994, ICC 94, SUPERCOMM/ICC '94, Conf. Record, Serving Humanity Through Communications, May 1-5, 1994, pp. 874-879, vol. 2.

* cited by examiner

METHOD AND APPARATUS FOR PROVIDING FRAME SYNCHRONIZATION IN A DIGITAL COMMUNICATION SYSTEM THAT SUPPORTS MULTIPLE MODULATION FORMATS

FIELD OF THE INVENTION

The invention relates to the field of digital communication systems and, in particular, to frame synchronization in optical digital communication systems.

BACKGROUND OF THE INVENTION

In digital communication systems (e.g., high-speed optical communication systems) information sequences and control information are commonly transmitted in the form of repetitive structures referred to as "frames". Such systems require synchronization between a transmitter and a receiver in order to recognize the presence and alignment of the frames at the receiver before any further decoding can take place. The transmitter inserts a frame alignment sequence (FAS), typically at the beginning of a frame, to determine the position of the frame in the received digitized stream. In the receiver, a frame synchronization module, referred to hereafter as "framer", detects the FAS and monitors frame alignment once initial frame acquisition has been accomplished.

Typically, optical communication systems use an ON/OFF Keying (OOK) modulation format, and framers for such systems are known in the art. In the field of high-speed optical communication, Differential Phase Shift Keying (DPSK) and Duobinary Signaling (DBS) modulation formats can offer significant advantages over the OOK format. To provide frame synchronization and determine the intended polarity of the transmitted stream, these modulation formats require specialized frame synchronization algorithms. However, in a communication network, multiple modulation formats may be used by component digital communication systems, and it is highly desirable to have the algorithmic behavior of the framers to be independent from and cross-compatible with multiple modulation formats.

Therefore, there is a need in the art for an improved method and apparatus for frame synchronization in digital communication systems that supports multiple modulation formats.

SUMMARY OF THE INVENTION

The present invention comprises a method and apparatus for frame synchronization in a digital communication system that may use one of several modulation formats.

In a first aspect of the invention, there is provided a method for frame synchronization. In one embodiment, the method performs a search for a frame alignment sequence (FAS) and the inverted FAS to provide frame synchronization and determines the polarity of the transmitted digital streams when Differential Phase Shift Keying (DPSK) or Duobinary Signaling (DBS) modulation formats are used.

In a second aspect of the invention, there is provided an apparatus for frame synchronization using the inventive method. In one embodiment, the apparatus comprises a multiplexer to collectively switch a digital stream, a controller of the multiplexer, a memory element that stores the FAS, and at least one frame synchronization module (i.e., framer). Embodiments of the apparatus provide frame synchronization and determine the polarity of the transmitted digital streams when DPSK or DBS modulation formats are used, and they are also compatible with digital streams that have been transmitted using an ON/OFF Keying (OOK) modulation format.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

It is to be noted, however, that the appended drawings illustrate only exemplary embodiments of this invention and are therefore not to be considered limiting of its scope, for the invention may admit to other equally effective embodiments.

DETAILED DESCRIPTION OF THE INVENTION

The present invention advantageously provides a method and apparatus for frame synchronization in a digital communication system using multiple modulation formats, such as a Differential Phase Shift Keying (DPSK) modulation format, a Duobinary Signaling (DBS) modulation format, and an ON/OFF Keying (OOK) modulation format.

Figure 1:
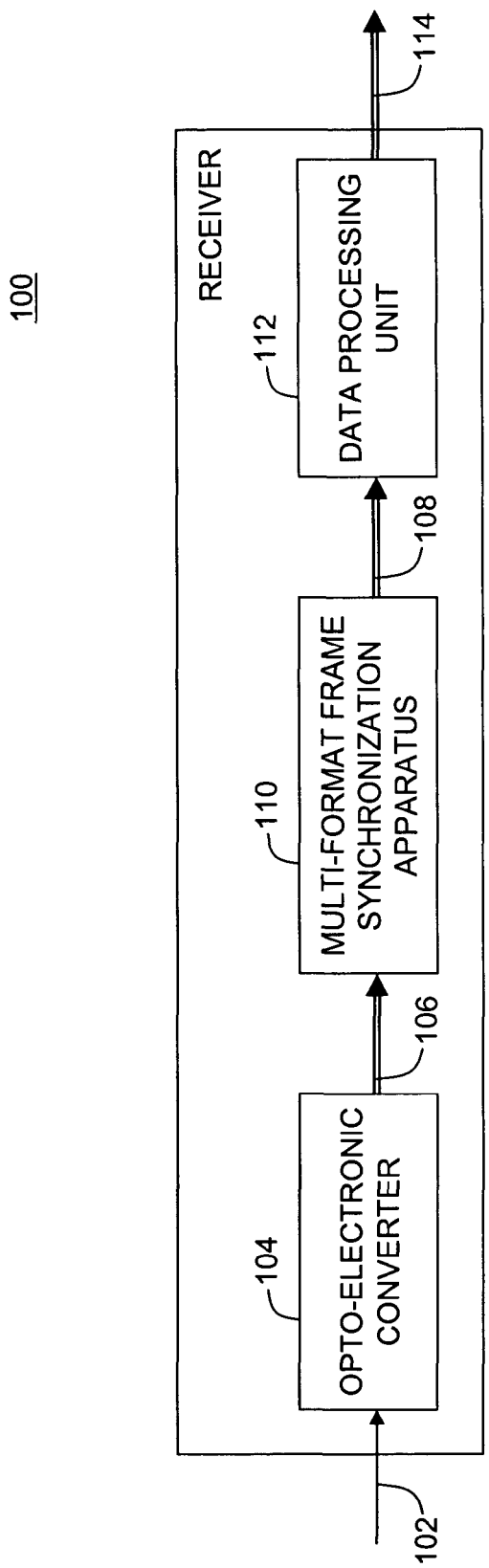
FIG. 1 depicts a schematic diagram of a receiver of an exemplary optical digital communication system in accordance with one embodiment of the present invention.

In FIG. 1 and in FIGS. 3-5 below, similar components are identified using the same reference numerals, except that the alphabetical suffixes are added, when appropriate, to differentiate between specific devices. Such components may also be referred to by their reference numeral without any appended suffix.

FIG. 1 depicts a schematic diagram of a receiver 100 of an exemplary optical communication system (not shown) having a bit rate of about 10 Gb/s or 40 Gb/s in accordance with one embodiment of the present invention. In one embodiment, the receiver 100 includes an opto-electronic converter 104, a multi-format frame synchronization apparatus (MFSA) 110, and a data processing unit 112. In an alternate embodiment (not shown), the MFSA 110 may be a portion of the data processing unit 112. An optical signal input of the opto-electronic converter 104 is illustratively coupled to an output fiber 102 of the optical communication system. The opto-electronic converter 104 transforms a modulated optical signal in a digital stream (in particular, a binary stream) that, via an electrical interface 106, is provided to the MFSA 110.

The MFSA 110 searches for and detects a frame alignment sequence (FAS) and/or the inverted FAS in the received digital stream. In case of the DPSK and DBS modulation formats, the MFSA 110 additionally determines the otherwise ambiguous polarity of the received digital stream. From the MFSA 110, the frame-aligned digital stream is forwarded, via a bus 108, to the data processing unit 112. An output of the data processing unit 112 is coupled, using a communication link 114 (e.g., wired or wireless link, gateway to the Internet, and the like), to the recipients (not shown) of the received information.

Herein, the polarity of the digital stream is defined as "0" when the MFSA 110 detects the FAS in the received stream. Accordingly, "when the MFSA 110 detects the inverted FAS in the received digital stream, the polarity of the received stream is defined as "1". The digital streams that are transmitted using DPSK or DBS modulation may have either polarity at the receiver, whereas the polarity of digital streams that are transmitted using OOK modulation is always "0". In one embodiment, the MFSA 110 inverts the bits in the received digital streams having polarity "1" before outputting such streams to the data processing unit 112.

Figure 2:
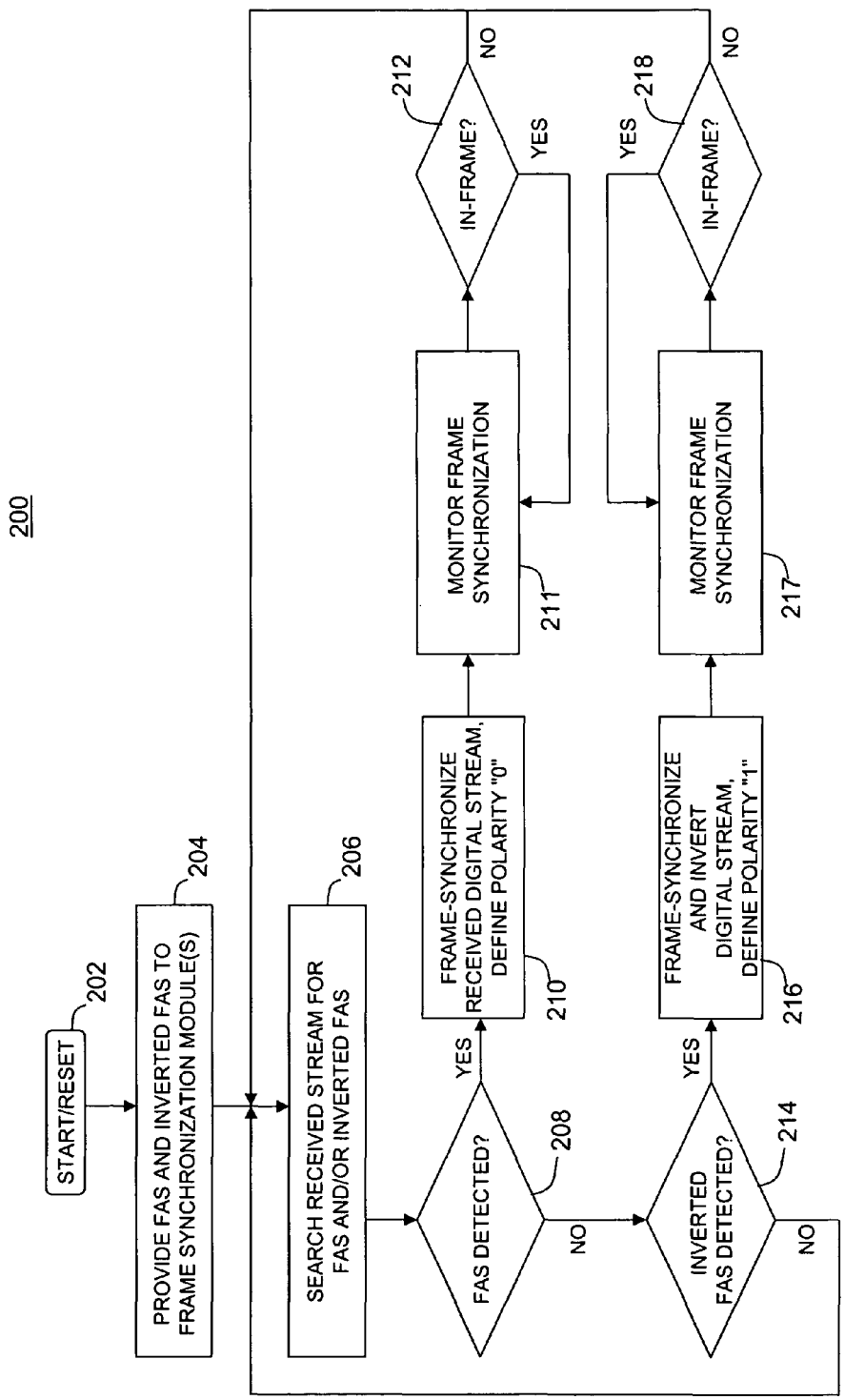
FIG. 2 depicts a flow diagram of a method for frame synchronization in the receiver of FIG. 1 in accordance with one embodiment of the present invention.

FIG. 2 depicts a flow diagram of one embodiment of the inventive method for frame synchronization in the receiver 100 of FIG. 1 as a process 200. The process 200 includes the steps performed to acquire frame synchronization of incoming digital streams that have been modulated using one of several modulation formats. In one embodiment, such processing steps are sequentially performed in the depicted order. In alternate embodiments, at least two of these processing steps may be performed contemporaneously or in a different order. The process 200 starts at step 202 and proceeds to step 204. At step 204, the FAS (e.g., a 48-bit binary sequence) and the inverted FAS (i.e., bit-inverted FAS) are supplied to one or more framers of the MFSA 110. In one embodiment, such framers are configured for providing frame synchronization in the received streams in a system that uses the OOK modulation format, i.e., the framers have an industry-standard configuration. When the MFSA 110 includes one framer, the FAS and the inverted FAS may intermittently be provided to the framer. At step 206, in the out-of-frame state, the framers search the incoming digital stream for the FAS and the inverted FAS.

At step 208, the process 200 queries if the FAS has been detected. If the query of step 208 is affirmatively answered, the process 200 proceeds to step 210. At step 210, the received digital stream is frame-synchronized and polarity "0" is assigned to the received digital stream. At step 211, the process proceeds to an in-frame monitoring state, where the input sequence is tested periodically for the presence of the FAS at the expected positions. At step 212, the process 200 queries if the FAS is found periodically at the expected positions in the received stream. If the query of step 212 is answered negatively once or a predetermined number of times, the system is considered to be out-of-frame and the process 200 proceeds to step 206. If the query of step 212 is affirmatively answered, the process returns to step 211.

If the query of step 208 is negatively answered, the process 200 ends to step 212. At step 214, the process 200 queries if the inverted FAS has been detected. If the query of step 214 is affirmatively answered, the process 200 proceeds to step 216. At step 216, the received digital stream is frame-synchronized and polarity "1" is assigned to the received digital stream. Additionally, at step 216, such data stream is bit-inverted. At step 217, the process proceeds to an in-frame monitoring state, where the input sequence is tested periodically for the presence of the inverted FAS at the expected positions. At step 218, the process 200 queries if the inverted FAS is found at the expected positions in the received stream. If the query of step 218 is answered negatively once or a predetermined number of times, the system is considered to be out-of-frame and the process 200 proceeds to step 206. If the query of step 218 is affirmatively answered, the process 200 returns to step 217.

If the query of step 214 is negatively answered, the process 200 proceeds to step 206 to repeat the search for the FAS and the inverted FAS until frame synchronization (i.e., in-frame state) is accomplished. In further embodiments, steps 214 may be performed before step 208 or steps 208 and 214 may be performed simultaneously.

For best understanding of embodiments discussed below in reference to FIGS. 3-5, the reader should refer simultaneously to FIG. 1.

Figure 3:
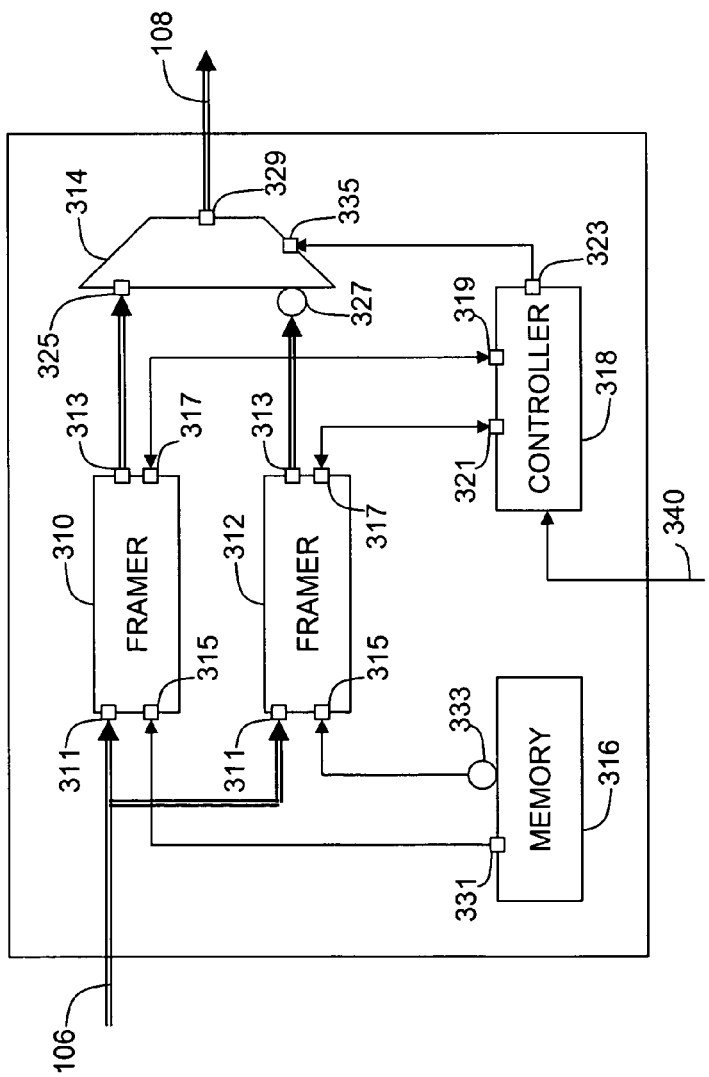
FIG. 3 depicts a schematic diagram of a frame synchronization apparatus of the receiver of FIG. 1 in accordance with one embodiment of the present invention.

FIG. 3 depicts a schematic diagram of a frame synchronization apparatus 110A in accordance with one embodiment of the present invention. The frame synchronization apparatus 110A generally comprises framers 310 and 312, a multiplexer 314 of a digital stream, a memory 316, and a controller 318. In one embodiment, the framers 310 and 312 have the same internal architecture and built-in frame synchronization algorithm as receivers of the digital communication systems using the OOK modulation format.

Data inputs, or nodes, 311 of the framers 310 and 312 are coupled the interface 106, and a data output (or node) 313 of each framer 310, 312 is coupled to a respective selectable port of the multiplexer 314. Specifically, the data output of the framer 310 is coupled to a non-inverting port 325, and the data output of the framer 312 is coupled to an inverting port 327 of the multiplexer 314. Herein, the terms "input" and "node", as well as the terms "output" and "node", are used interchangeably.

The memory 316 provides the FAS and the inverted FAS to configuration inputs 315 of the framer 310 and the framer 312, respectively. Arbitrarily, in the depicted embodiment, the memory 316 illustratively comprises a non-inverting output 331 for outputting the FAS and an inverting output 333 FAS for outputting the inverted FAS. Alternatively, when the memory 316 comprises only the non-inverting output 331, such an output may be coupled, through an inverter (not shown) to the configuration input 315 of the framer 312. Similarly, when the memory 316 comprises only the inverting output 333, such an output may be coupled, through an inverter (not shown), to the configuration input 315 of the framer 310.

The framers 310 and 312 independently search for the FAS (framer 310) and the inverted FAS (framer 312). Once a framer detects the FAS or the inverted FAS, the framer facilitates frame synchronization in the received digital stream. Each framer selectively communicates to the controller 318 when the FAS (framer 310) or the inverted FAS (framer 312) are detected and, as such, the digital stream is frame-synchronized. Such information is provided from status outputs 317 of the framers to the respective status inputs 319 and 321 of the controller 318.

An output 323 of the controller 318 is coupled to a selecting port 335 of the multiplexer 314. Once the FAS or the inverted FAS has been detected by one of the framers, the controller 318 sets the multiplexer 314 to provide connectivity between the data output 313 of that framer to the output 329 of the multiplexer 314 and, as such, to the bus 108.

For example, when the framer 310 detects the FAS, the controller 318 sets the multiplexer 314 to provide connectivity between the non-inverting selectable port 325 and the output 329. This setting of the multiplexer 314 corresponds to the in-frame state of the received digital streams that have been transmitted using OOK modulation or one of the DPSK or DBS modulation formats with the polarity "0".

Accordingly, when the framer 312 detects the inverted FAS, the controller 318 sets the multiplexer 314 to provide connectivity between the inverting selectable port 327 and the output 329. This setting corresponds to the in-frame state of the received digital streams having one of the DPSK and DBS modulation formats with the polarity "1".

In one embodiment, in the in-frame state, a portion of electronic circuits in the framers 310 and 32 may by switched off to reduce power consumption in the framers. In the depicted embodiment, the controller 318, via an interface 340, is coupled to an optional synchronization monitoring unit (not shown) that may also control on/off state of such circuits of the framers.

When the DPSK or DBS modulation formats are not used in the digital communication system, the framer 312 may be disabled (e.g., turned off) and the multiplexer 314 set to provide connectivity between the non-inverting selectable port 325 and the output 329.

Figure 4:
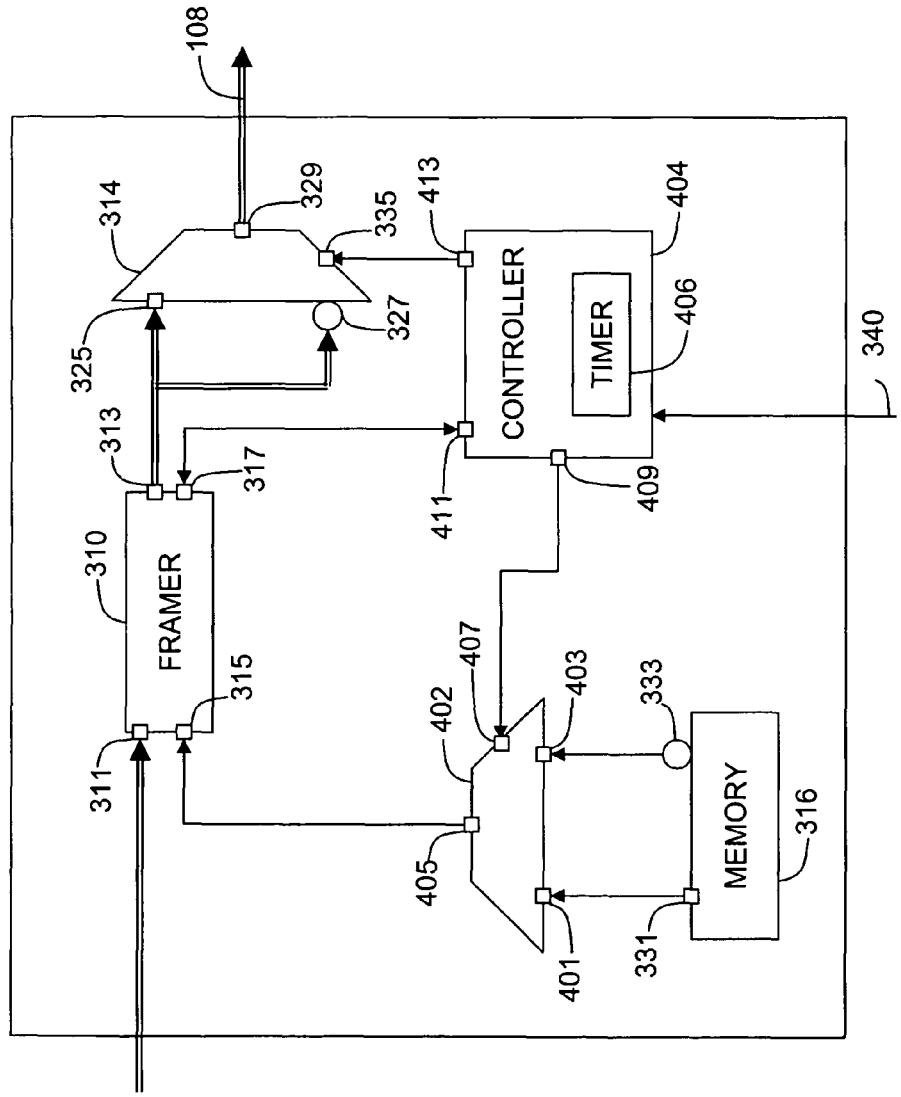
FIG. 4 depicts a schematic diagram of a frame synchronization apparatus of the receiver of FIG. 1 in accordance with another embodiment of the present invention.

FIG. 4 depicts a frame synchronization apparatus 110B in accordance with another embodiment of the present invention. The frame synchronization apparatus 110B generally comprises the framer 310, the multiplexer 314, the memory 316, a multiplexer 402, and a controller 404.

The data input 311 of the framer 310 is coupled to the interface 106 and the data output 313 of the framer is coupled, in parallel, to the non-inverting port 325 and the inverting port 327 of the multiplexer 314.

The memory 316 provides the FAS and the inverted FAS to selectable inputs 401 and 403 of the multiplexer 402 which output 405 is coupled to the configuration input 315 of the framer 310. When the memory 316 comprises only the non-inverting output 331 or only the inverting output 333, such an output may be coupled, through an inverter (not shown) to one of selectable inputs of the multiplexer 402 or, alternatively, the multiplexer 402 may comprise an inverting selectable input (e.g., input 403).

The controller 404 includes a timer 406 and, in operation, defines the settings of the multiplexer 314 and 402. Similar to the controller 318 (discussed in reference to FIG. 3 above), the controller 404 is also coupled, via the interface 340, to the optional synchronization monitoring unit. In an out-of-frame mode, the controller 404, via an output 409 coupled to a selecting port 407 of the multiplexer 402, intermittently provides, for a duration of a pre-determined time interval ΔT, or equivalently, a given number of incoming symbols, one of the FAS and the inverted FAS to the configuration input 315 of the framer 310. The duration of the time interval ΔT is controlled using the timer 406 and, generally, comprises several frame periods (e.g. 2-5 frame periods), while the minimal duration of the time interval ΔT is equal to duration of one frame period in the received digital stream.

The search the FAS and the inverted FAS (i.e., cyclical switching the selectable ports 410 and 403 of the multiplexer 402) is repeated until the in-frame state is accomplished. Similarly, in operation, such a search is repeated when the frame synchronization is lost and should be restored.

The status output 317 of the framer 310 is coupled to a status input 411 of the controller 404, and an output 413 of the controller 404 is coupled to a selecting port 329 of the multiplexer 314. The framer 310 communicated to the controller 404 when the in-frame state is established, while the controller keeps track if that happened when the FAS or the inverted FAS was supplied to the framer 310.

When the frame synchronization is accomplished during the time of supplying the FAS to the framer 310, the controller 310 sets the multiplexer 314 to provide connectivity between the non-inverting selectable port 325 and the output 329. This setting of the multiplexer 314 corresponds to the frame-synchronized digital streams that were transmitted using OOK modulation or one of the DPSK and DBS modulation formats with the polarity "0".

Oppositely, when the frame synchronization is accomplished during the time of supplying the inverted FAS to the framer 310, the controller 310 sets the multiplexer 314 to provide connectivity between the inverting selectable port 327 and the output 329. This setting corresponds to the frame-synchronized digital streams having one of the DPSK or DBS modulation formats with the polarity "1".

When the DPSK or DBS modulation formats are not used in the digital communication system, the multiplexer 314 may be set to supply only the FAS to the framer 310.

Figure 5:
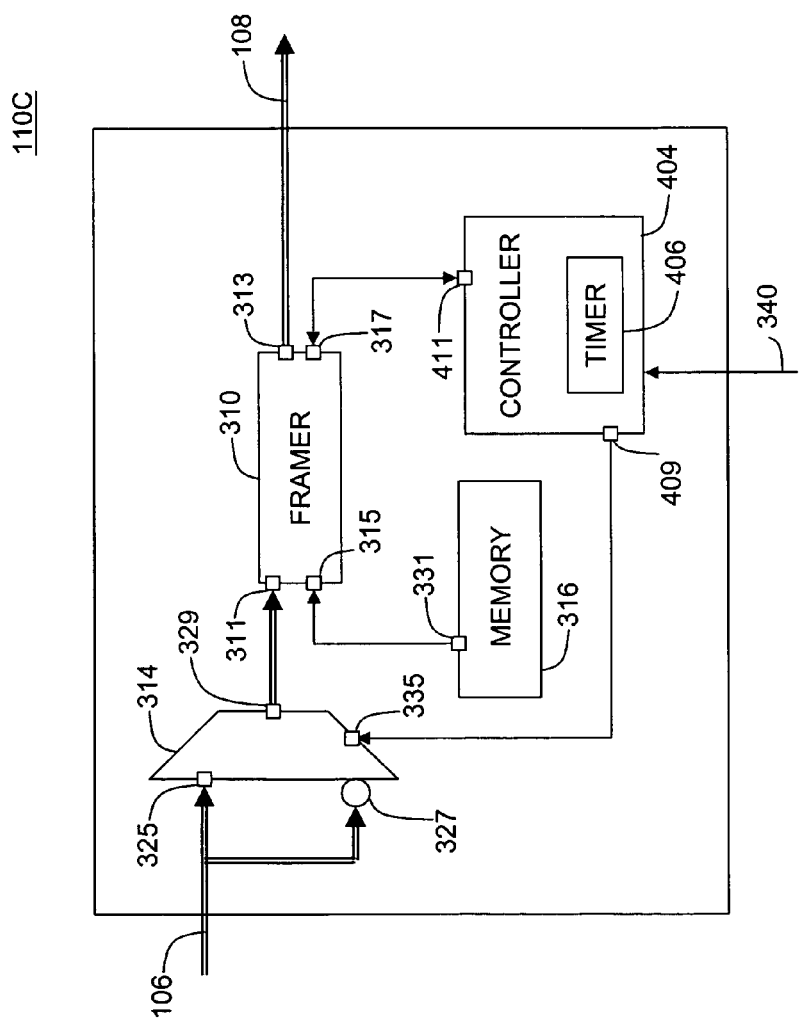
FIG. 5 depicts a schematic diagram of a frame synchronization apparatus of the receiver of FIG. 1 in accordance with yet another embodiment of the present invention.

FIG. 5 depicts a frame synchronization apparatus 110C in accordance with yet another embodiment of the present invention. The frame synchronization apparatus 110C generally comprises the framer 310, the multiplexer 314, the memory 316, and the controller 404. The interface 106 in coupled, in parallel, to the selectable inputs 325 and 327 of the multiplexer 314, while the output 329 of the multiplexer and the bus 108 are coupled to the data input 311 and the data output 313 of the framer 310, respectively.

In this embodiment, the output 409 of the controller 404 is coupled to the selecting port 335 of the multiplexer 314. In operation, in the out-of-frame state, the controller 404 intermittently connects, for the duration of the time interval ΔT, the data input 311 of the framer 310 to non-inverted and inverted the received digital streams provided by the interface 106.

The search for the FAS and the inverted FAS (i.e., cyclical switching the selectable ports of the multiplexer 314) is repeated until the in-frame state is accomplished. Similarly, in operation, such a search is repeated when frame synchronization is lost and should be restored. The framer 310 communicates to the controller 404 when the in-frame state is established, while the controller keeps track if that happened when the non-inverted or the inverted digital streams were supplied to the framer 310.

Similar to the apparatus 110B (discussed in reference to FIG. 4 above), the duration of the time interval ΔT is controlled using the timer 406. Generally, such duration comprises several frame periods (e.g. 2-5 frame periods), while the minimal duration of the time interval ΔT is equal to duration of one frame period.

When the frame synchronization is accomplished during the time of supplying the non-inverted digital stream to the framer 310, the controller 310 sets the multiplexer 314 to provide, in operation, connectivity between the non-inverting selectable port 325 and the output 329. This setting of the multiplexer 314 corresponds to the frame-synchronized digital streams having been transmitted using the OOK modulation format or one of the DPSK and DBS modulation formats, and detected with the polarity "0".

Oppositely, when the frame synchronization is accomplished during the time of supplying the inverted bit sequences to the framer 310, the controller 310 sets the multiplexer 314 to provide, in operation, connectivity between the inverting selectable port 327 and the output 329. This setting corresponds to the frame-synchronized digital streams having one of the DPSK and DBS modulation formats with the polarity "1".

When the DPSK or DBS modulation formats are not used in the digital communication system, the multiplexer 314 may be set to provide connectivity between the non-inverting selectable port 325 and the output 329.

In one illustrative embodiment, the apparatuses 100A-100C were reduced to practice using framers commercially available from Broadcom Corporation of Irvine, Calif. and other suppliers.

The invention is described above as using specific functions and devices. It will be appreciated by those skilled in the art that a large number of functions and devices that may alternatively be employed, either individually or in combination, to achieve the objects of the invention described herein are within the scope of the invention.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method of frame synchronization in a digital communication receiver, comprising:
   (a) inverting one of a reference frame alignment sequence (FAS) and a digital stream (DS) including a FAS to produce a respective one of an inverted FAS and an inverted DS;
   (b) multiplexing the inverted FAS or DS with its corresponding non-inverted FAS or DS to produce a multiplexed FAS or DS;
   (c) comparing the other one of the reference FAS and DS to the multiplexed FAS or DS to detect thereby the FAS within the DS, wherein said comparing is performed by a framer comprising a first input node for inputting the DS, a first output node for outputting a frame-synchronized DS to a data processor, a second input node for inputting the multiplexed inverted reference FAS and non-inverted reference FAS, and a second output node for outputting frame synchronization status data; and
   (d) using the detected FAS to synchronize frames within the DS.

2. The method of claim 1 wherein the inverted reference FAS is multiplexed with the non-inverted reference FAS, and the multiplexed reference FAS and inverted reference FAS are compared to the DS to detect the FAS within the DS.

3. The method of claim 1 wherein the step (c) further comprises:
   intermittently submitting the reference FAS and the inverted FAS or DS to the framer.

4. The method of claim 1 wherein the step (c) further comprises:
   comparing the other one of the FAS and DS to the multiplexed FAS or DS for a time interval that is equal to or greater than one frame period.

5. The method of claim 1 wherein the DS uses ON/OFF Keying modulation.

6. The method of claim 1 wherein the step (d) further comprises:
   defining a polarity "0" when a non-inverted reference FAS is detected in the incoming digital stream.

7. The method of claim 1 wherein the step (d) further comprises:
   defining a polarity "1" when an inverted reference FAS is detected in the digital stream.

8. The method of claim 1 wherein the DS is inverted and multiplexed with the non-inverted DS, and the multiplexed DS and inverted DS are compared to the reference FAS to detect the reference FAS within the DS.

9. A frame synchronization apparatus for a receiver in a digital communication system, comprising:
   a memory for storing a reference frame alignment sequence (FAS) associated with a digital signal (DS);
   a multiplexer for multiplexing an inverted FAS with its corresponding non-inverted FAS; and
   a framer for comparing the multiplexed inverted FAS and non-inverted reference FAS and DS to detect within the received DS a corresponding FAS, the framer comprising a first input node for inputting the DS, a first output node for outputting a frame-synchronized DS to a data processor, a second input node for inputting the multiplexed inverted reference FAS and non-inverted reference FAS, and a second output node for outputting frame synchronization status data.

10. The apparatus of claim 9 wherein the framer comprises a detector for detecting either of the non-inverted reference FAS or the inverted reference FAS.

11. The apparatus of claim 9, further comprising a second framer, wherein said multiplexer operates to select for further processing the output of one of said framers.

12. The apparatus of claim 11 wherein the memory provides the non-inverted reference FAS to the second input node of the first framer and provides the inverted reference FAS to the second input node of the second framer.

13. The apparatus of claim 11 wherein a non-inverting selectable port of the multiplexer is coupled to the first output node of the first framer, an inverting selectable port of the multiplexer is coupled to the first output node of the second framer, and an output of the multiplexer is coupled to the data processor.

14. The apparatus of claim 11 wherein the first input node of the first framer and the first input node of the second framer are coupled to a source of the DS.

15. The apparatus of claim 9 having a single framer and further comprising a FAS multiplexer.

16. The apparatus of claim 9 having a single framer.

17. The apparatus of claim 16 wherein the memory comprises an output node outputting the reference FAS to the second input node of the single framer.

18. The apparatus of claim 16 wherein a non-inverting selectable port of the multiplexer and an inverting selectable port of the multiplexer are coupled to a source of the DS and an output of the multiplexer is coupled to the first input node of the single framer.

19. The apparatus of claim 9, further comprising a second framer, wherein said multiplexer operates to select for further processing the output of one of said framers.

20. The apparatus of claim 19 wherein the non-inverted DS is provided to second input node of the first framer and the inverted DS is provided to the second input node of the second framer.

21. The apparatus of claim 19 wherein a non-inverting selectable port of the multiplexer is coupled to the first output node of the first framer, an inverting selectable port of the multiplexer is coupled to the first output node of the second framer, and an output of the multiplexer is coupled to the data processor.

22. A frame synchronization apparatus for a receiver in a digital communication system, comprising:
   a memory for storing a reference frame alignment sequence (FAS) associated with a digital signal (DS);
   a multiplexer for multiplexing an inverted DS with its corresponding non-inverted DS; and
   a first framer for comparing the multiplexed inverted DS and non-inverted reference FAS and DS to detect within the received DS a corresponding FAS, the framer comprising a first input node for inputting the DS, a first output node for outputting a frame-synchronized DS to a data processor, a second input node for inputting the multiplexed inverted reference FAS and non-inverted reference FAS, and a second output node for outputting frame synchronization status data.

23. The apparatus of claim 22 wherein the first framer comprises a detector for detecting either of the non-inverted reference FAS or the inverted reference FAS.

24. The apparatus of claim 22, further comprising a second framer, wherein said multiplexer operates to select for further processing the output of one of said framers.

25. The apparatus of claim 22 wherein the memory provides the non-inverted reference FAS to the second input node of the first framer and provides the inverted reference FAS to the second input node of the second framer.

26. The apparatus of claim 24 wherein a non-inverting selectable port of the multiplexer is coupled to the first output node of the first framer, an inverting selectable port of the multiplexer is coupled to the first output node of the second framer, and an output of the multiplexer is coupled to the data processor.

27. The apparatus of claim 24 wherein the first input node of the first framer and the first input node of the second framer are coupled to a source of the DS.

28. The apparatus of claim 22 having a single framer and further comprising a FAS multiplexer.

29. The apparatus of claim 22 having a single framer.

30. The apparatus of claim 22 wherein the memory comprises an output node outputting the reference FAS to the second input node of the single framer.

31. The apparatus of claim 22 wherein a non-inverting selectable port of the multiplexer and an inverting selectable port of the multiplexer are coupled to a source of the DS and an output of the multiplexer is coupled to the first input node of the single framer.

32. The apparatus of claim 22, further comprising a second framer, wherein said multiplexer operates to select for further processing the output of one of said framers.

33. The apparatus of claim 22 wherein the non-inverted DS is provided to second input node of the first framer and the inverted DS is provided to the second input node of the second framer.

34. The apparatus of claim 22 wherein a non-inverting selectable port of the multiplexer is coupled to the first output node of the first framer, an inverting selectable port of the multiplexer is coupled to the first output node of the second framer, and an output of the multiplexer is coupled to the data processor.

* * * * *